United States Patent
Wang et al.

(10) Patent No.: US 8,259,916 B2
(45) Date of Patent: Sep. 4, 2012

(54) MUSICAL CALLER ID APPARATUS AND METHOD

(75) Inventors: Chuan-Hong Wang, Taipei Hsien (TW);
Li-Zhang Huang, Taipei Hsien (TW);
Hsiao-Chung Chou, Taipei Hsien (TW);
Xiao-Guang Li, Shenzhen (CN);
Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1006 days.

(21) Appl. No.: 12/212,610

(22) Filed: Sep. 17, 2008

(65) Prior Publication Data

US 2009/0225966 A1 Sep. 10, 2009

(51) Int. Cl.
*H04M 1/56* (2006.01)
*H04M 15/06* (2006.01)
*H04M 3/42* (2006.01)

(52) U.S. Cl. .................................. 379/142.06; 455/415

(58) Field of Classification Search ............. 379/142.06; 84/609

See application file for complete search history.

(56) References Cited

U.S. PATENT DOCUMENTS

| | | | |
|---|---|---|---|
| 7,012,999 B2 | 3/2006 | Ruckart | |
| 7,439,439 B2* | 10/2008 | Hayes et al. | 84/600 |
| 2002/0168964 A1* | 11/2002 | Kraft | 455/412 |
| 2002/0196914 A1* | 12/2002 | Ruckart | 379/88.21 |
| 2003/0152205 A1* | 8/2003 | Winkler | 379/142.06 |
| 2006/0025968 A1* | 2/2006 | Sano | 702/189 |
| 2008/0066609 A1* | 3/2008 | Bourgeois | 84/609 |
| 2008/0080688 A1* | 4/2008 | Burgan et al. | 379/142.04 |

FOREIGN PATENT DOCUMENTS

| | | |
|---|---|---|
| CN | 1125414 | 10/2003 |
| CN | 1159945 | 7/2004 |

* cited by examiner

*Primary Examiner* — Fan Tsang
*Assistant Examiner* — Jeffrey Lytle
(74) *Attorney, Agent, or Firm* — Altis Law Group, Inc.

(57) ABSTRACT

An incoming call prompting method is provided. The method receiving an incoming call decoding the phone number of the incoming call so as to obtain a digit set from the phone number stored in the data storage system. The method further includes determining a call number character of the incoming call and assigning musical notes associated with the numbers of the digit set according to the musical note table. Furthermore, the method includes obtaining corresponding audio clip of each note from an audio clip database and outputting the audio clips with the corresponding rhythm of the call number character of the incoming call through a music output apparatus.

1 Claim, 2 Drawing Sheets

MUSICAL CALLER ID APPARATUS AND METHOD

BACKGROUND

1. Field of the Disclosure

Embodiments of the present disclosure relate to caller identification (ID), and more particularly to a apparatus and method for generating a music caller ID.

2. Description of the Related Art

Portable communication apparatus, such as cell phones, have become indispensable tools in our daily lives. Many functions are available now with cell phones, for example, caller ID, among other things. Caller ID allows users to easily screen their calls.

Recently, a caller ID system has been developed that can audibly reveal a phone number and/or other information of a received call by the use of an electronically generated voice so that a user does not even have to look at his/her phone to know who is calling.

One such caller ID system obtains voice clips corresponding to one or more numbers (0-9) of a phone number of an incoming call, from an audio clip database, and sends the proper combination and sequence of voice clips to a voice generating chip to be output to a user.

However, even the caller ID system is convenient, the sound of the voice clips may not be pleasing to the human ears.

Therefore, what is needed is an improved caller ID apparatus for identifying callers.

SUMMARY

A computer-implemented method for identifying a user corresponding to an incoming call is provide. The method includes: providing a data storage system that stores a musical note table, a music parameters table, an audio clip database, the musical note table assigning a musical note for each digit in a received phone number of an incoming call, the music parameters table storing relationships between a call number character and a music parameter, and the audio clip database storing pre-recorded audio clips which is played in different parameters; receiving the incoming call and decoding the phone number of the incoming call; storing the phone number in the data storage system; obtaining a digit set from the phone number stored in the data storage system; determining a call number character of the incoming call and obtaining the music parameters from the music parameter table according to the call number character of the incoming call; assigning the musical notes associated with the numbers of the digit set according to the musical note table; obtaining corresponding audio clip of each musical note from the audio clip database and outputting the audio clips with the corresponding rhythm of the call number character of the incoming call through a music output apparatus.

Other advantages and novel features will be drawn from the following detailed description of the preferred embodiment with reference to the attached drawings.

BRIEF DESCRIPTION OF THE DRAWINGS

The components of the drawings are not necessarily drawn to scale, the emphasis instead being placed upon clearly illustrating the principles of a musical caller ID apparatus. Moreover, in the drawings, like reference numerals designate corresponding parts throughout several views.

DETAILED DESCRIPTION

Figure 1:
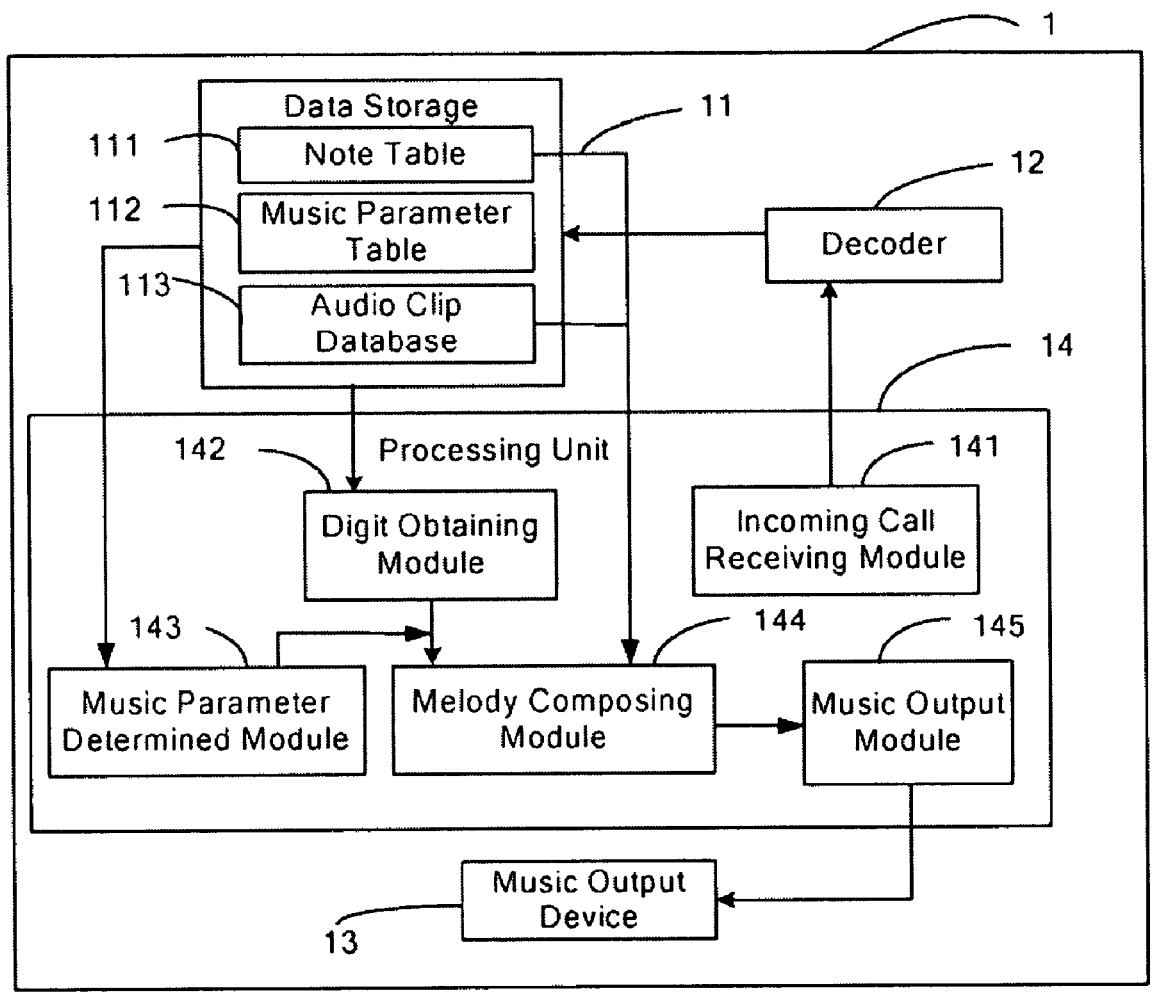
FIG. 1 is a block diagram of an musical caller ID apparatus in accordance with one embodiment of the present disclosure.

FIG. 1 is a block diagram of a musical caller ID apparatus 1 (hereinafter "the apparatus") in accordance with one embodiment of the present disclosure. In one embodiment, the apparatus 1 includes a data storage system 11, a decoder 12, a music output apparatus 13, and a processing unit 14. The data storage system 11 stores a musical note table 111, a music parameters table 112, and an audio clip database 113 as will be further described herein. In one embodiment, the apparatus 1 may be a cellphone, PDA, or other apparatus with a communication and audio function.

The musical note table 111 assigns a musical note for each digit (0-9) in a received phone number (hereinafter, "the call number"), as shown in Table 1.

TABLE 1

| | Digit | | | | | | | | | |
|---|---|---|---|---|---|---|---|---|---|---|
| | 1 | 2 | 3 | 4 | 5 | 6 | 7 | 8 | 9 | 0 |
| Note | do | re | mi | fa | sol | la | ti | do | re | mi |

The relationship between the digits and the musical notes is not limited to that defined in the musical note table 111. The relationship can also be defined by the user. The musical note table 111 is based on the "Just Intonation Music Scale" as an example, but other scales can be used according to manufacturer or user preference.

The music parameters table 112 stores a relationship between a call number character and music parameters, such as rhythm, and an instrumental sound from an instrument. In this embodiment, the call number character has two forms: one form corresponds to digits of the call number, and the other form corresponds to classes of the call number. The call number can be classified according to family, friends, colleagues, classmates, and relatives according to a relationship between the caller and the user, and also can be classified to an unable-recognized call, an international call, a national call, and a local call according to the incoming call number. The relationship between digits and the music parameters are shown in Table 2. The relationship between classes of the call number and the music parameters are shown in Table 3 and Table 4.

TABLE 2

| | Digit | | | | | | | | | |
|---|---|---|---|---|---|---|---|---|---|---|
| | 1 | 2 | 3 | 4 | 5 | 6 | 7 | 8 | 9 | 0 |
| Rhythm | Quick | Slow | Slow | Quick | Quick | Slow | Slow | Quick | Quick | Quick |
| Instrument | Drum | Flute | Piano | Violin | Quitar | Koto | Accordion | Lute | Flute | Saxophone |

TABLE 3

| Class | Family | Friend | Colleague | Classment | Relative |
|---|---|---|---|---|---|
| Rhythm Instrument | Quick Drum | Slow Flute | Slow Piano | Quick Violin | Quick Quitar |

TABLE 4

| Class | Non-recognized | International call | National call | Local call |
|---|---|---|---|---|
| Rhythm Instrument | Quick Drum | Slow Flute | Slow Piano | Quick Violin |

Rhythms, in the above Table 2, Table 3, and Table 4, can be set according to a time that each musical note is played. For example, playing three musical notes every second can be set to be played quickly, and playing one musical note every second can be set to be slowly. In practice, the rhythms are not limited to be played quickly and slowly, and can be defined to more kinds of rhythms. The instruments, in the above Table 2, Table 3, and Table 4, are exemplary instrument to play the musical notes.

The audio clip database 113 stores prerecorded audio clips of each musical note played in different instruments. Taking musical note "do" for example, the audio clips of the musical note "do" that is played by different instruments are all stored in the audio clip database. These musical notes may be pre-determined as mentioned above.

The processing unit 14 includes an incoming call receiving module 141, a digit obtaining module 142, a music parameter determined module 143, a melody composing module 144, and a music output module 145. The modules 141, 142, 143, 144, 145 may be used to execute one or more operations for the apparatus 1 as will be further described below.

The incoming call receiving module 141 is configured for receiving an incoming call and sending the incoming call to a decoder 12 to obtain a phone number of the incoming call and storing the phone number in the data storage system 11.

The digit obtaining module 142 is configured for selecting one or more digits of the phone number (hereinafter, "the digit set") stored in the data storage system 11. It may be understood that the digit set may comprise all the digits of the phone number, or may comprise some of the digits of the phone number. For example, if the phone number is "13956123846," a user, not wanting a long musical note melody, may associate an abbreviated digit pattern with the phone number. The digit pattern may, for example, use only the third, sixth, eighth, tenth, and eleventh digits of the phone number, so the digit set is "91346." Selective selection of one or more digits of the phone number may be useful for a user to remember who is calling based on the outputted sound.

The music parameter determined module 143 is configured for determining the call number character of the incoming call and obtaining the music parameters from the music parameter table 113 according to the call number character. Taking the above call number "13956123846" for example, if the second digit of the incoming call number is predetermined as a call number character, the music parameter determined module 143 obtains the second digit in the call number "13956123846", namely the digit "3," as a call number character, and then obtains the corresponding music parameters of the digit "3," namely "rhythm is 'slow,' instrument is 'piano'," in the Table 2.

The melody composing module 144 is for composing a melody according to the digit set from the phone number stored in the data storage system 11. The melody composition process includes receiving a digit set from the digit obtaining module 142, and assigning the musical notes associated with the numbers of the digit set in turn according to the musical note table 111.

The music generating module 144 is for obtaining a corresponding audio clip of each musical note from the audio clip database 113 and outputting the audio clips with the corresponding rhythm of the call number character of the incoming call through the music output apparatus 13.

Figure 2:
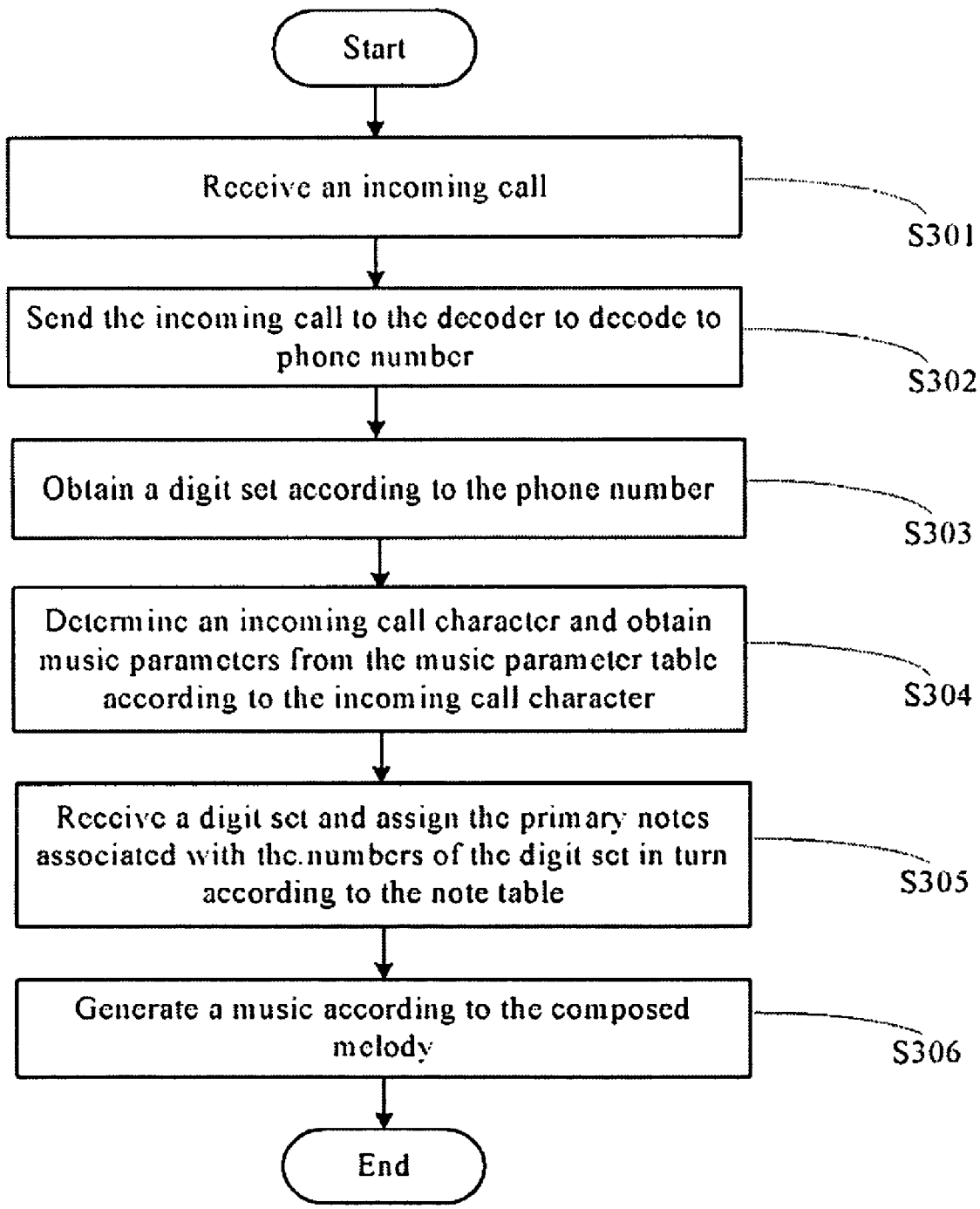
FIG. 2 is a flowchart of one embodiment of a method for outputting audio signal corresponding to receiving an incoming call.

FIG. 2 is a flowchart of one embodiment of a method for outputting audio signal corresponding to receiving an incoming call. Depending on the embodiment, additional blocks may be added, others deleted, and the ordering of the blocks may be changed. In block S301, the incoming call receiving module 141 receives an incoming call.

In block S302, the incoming call receiving module 141 sends the incoming call to the decoder 12 to decode a phone number of the incoming call and to store the phone number in the data storage system 11.

In block S303, the digit obtaining module 142 obtains a digit set according to the phone number stored in the data storage system 11.

In block S304, the music parameter determined module 143 determines a corresponding call number character of the incoming call for the obtained digit set, and obtains corresponding music parameters from the music parameter table 113 according to the incoming call character.

In block S305, the melody composing module 143 receives the digit set from the digit obtaining module 142 and assigns one or more musical notes associated with the numbers of the digit set in turn according to the musical note table 111.

In block S306, the music generating module 144 obtains corresponding audio clips for each musical note from the audio clip database 113 and outputs the audio clips with the corresponding rhythm of the call number character of the incoming call through the music output apparatus 13.

Although the present disclosure has been specifically described on the basis of various inventive embodiment, the present disclosure is not to be construed as being limited thereto. Various changes or modifications may be made to the embodiments without departing from the scope and spirit of the present disclosure.

What is claimed is:
1. A music caller identification (ID) apparatus, comprising:
  a data storage system that stores a musical note table, a music parameters table, an audio clip database, the musical note table assigning a musical note for each digit in a received phone number of an incoming call, the music parameter table storing relationships between a call number character and corresponding music parameters, and the audio clip database storing prerecorded audio clips of each musical note which is played according to different music parameters;
  a decoder configured for decoding the phone number;
  an incoming call receiving module configured for receiving the incoming call and sending the incoming call to the decoder to decode the phone number of the incoming call and to store the phone number in the data storage system;
  a digit obtaining module configured for obtaining a digit set from the phone number stored in the data storage system;
  a music parameter determined module for determining a call number character of the incoming call and obtaining the corresponding music parameters from the music parameter table according to the call number character of the incoming call;

a melody composing module for receiving the digit set from the digit obtaining module and assigning the musical notes associated with the numbers of the digit set according to the musical note table; and a music generating module for obtaining a corresponding audio clip for each musical note from the audio clip database and outputting the audio clip(s) through a music output apparatus to form a music;

wherein the call number character is a digit of the call number.

* * * * *